(12) United States Patent
Tartz et al.

(10) Patent No.: US 9,747,428 B2
(45) Date of Patent: Aug. 29, 2017

(54) DYNAMIC KEYBOARD AND TOUCHSCREEN BIOMETRICS

(71) Applicant: QUALCOMM Incorporated, San Diego, CA (US)

(72) Inventors: Robert Scott Tartz, San Marcos, CA (US); Richard Oliver Farley, San Diego, CA (US); John Keith Schneider, Williamsville, NY (US); Virginia Walker Keating, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 14/169,007

(22) Filed: Jan. 30, 2014

(65) Prior Publication Data

US 2015/0213245 A1 Jul. 30, 2015

(51) Int. Cl.
*G06F 21/32* (2013.01)
*G06F 21/83* (2013.01)

(52) U.S. Cl.
CPC .............. *G06F 21/32* (2013.01); *G06F 21/83* (2013.01)

(58) Field of Classification Search
None
See application file for complete search history.

(56) References Cited

U.S. PATENT DOCUMENTS

| 7,486,810 | B1* | 2/2009 | Accapadi ................ G06F 21/32 382/124 |
| 8,983,207 | B1* | 3/2015 | Ran ........................ G06F 21/32 382/181 |
| 2006/0224898 | A1 | 10/2006 | Ahmed et al. |
| 2008/0212846 | A1* | 9/2008 | Yamamoto ......... G06K 9/00087 382/115 |
| 2009/0189791 | A1* | 7/2009 | Brinton ................. G06F 21/316 341/22 |
| 2010/0257601 | A1 | 10/2010 | Bolyukh et al. |
| 2011/0300830 | A1* | 12/2011 | Ramrattan .......... H04L 63/0861 455/411 |
| 2012/0313754 | A1 | 12/2012 | Bona |
| 2013/0067547 | A1 | 3/2013 | Thavasi et al. |
| 2013/0208103 | A1 | 8/2013 | Sands et al. |

(Continued)

OTHER PUBLICATIONS

International Search Report and Written Opinion—PCT/US2015/011609—ISA/EPO—dated Apr. 8, 2015.

(Continued)

*Primary Examiner* — Farid Homayounmehr
*Assistant Examiner* — Thanh T Le
(74) *Attorney, Agent, or Firm* — Kilpatrick Townsend & Stockton, LLP

(57) ABSTRACT

Embodiments of the present invention are directed toward providing ongoing authentication using biometric data. Fingerprints and/or other biometric data can be captured during the normal use of an electronic device, such as typing on a keyboard, and compared with associated reference biometrics to provide ongoing authentication to an application while the electronic device is being used. Comparison results may further be combined with additional physiological or behavioral biometrics to determine a level of authentication encompassing multiple biometric inputs and/or types.

38 Claims, 7 Drawing Sheets

(56) References Cited

U.S. PATENT DOCUMENTS

| | | | | |
|---|---|---|---|---|
| 2014/0049653 A1* | 2/2014 | Leonard | ............... | G06T 1/0042 |
| | | | | 348/207.1 |
| 2014/0297528 A1* | 10/2014 | Agrawal | .......... | G06Q 20/40145 |
| | | | | 705/44 |
| 2014/0331059 A1* | 11/2014 | Rane | .................. | G06K 9/00093 |
| | | | | 713/186 |
| 2014/0333414 A1* | 11/2014 | Kursun | .............. | G06K 9/00926 |
| | | | | 340/5.82 |

OTHER PUBLICATIONS

Feng T., et al., "Continuous Remote Mobile Identity Management Using Biometric Integrated Touch-Display," 45th Annual IEEE/ACM International Symposium on Microarchitecture Workshops (MICROW), 2012, pp. 55-62.

Frank M., et al., "Touchalytics: On the Applicability of Touchscreen Input as a Behavioral Biometric for Continuous Authentication," IEEE Transactions on Information Forensics and Security, vol. 8 (1), Jan. 2013, pp. 136-148.

Lin C.C., et al., "A New Non-Intrusive Authentication Method based on the Orientation Sensor for Smartphone Users," 2012 IEEE Sixth International Conference on Software Security and Reliability (SERE), Jun. 2012, pp. 245-252.

Monsore F., et al., "Keystroke dynamics as a biometric for authentication," Future Generation Computer Systems, vol. 16, 2000, pp. 351-359.

* cited by examiner

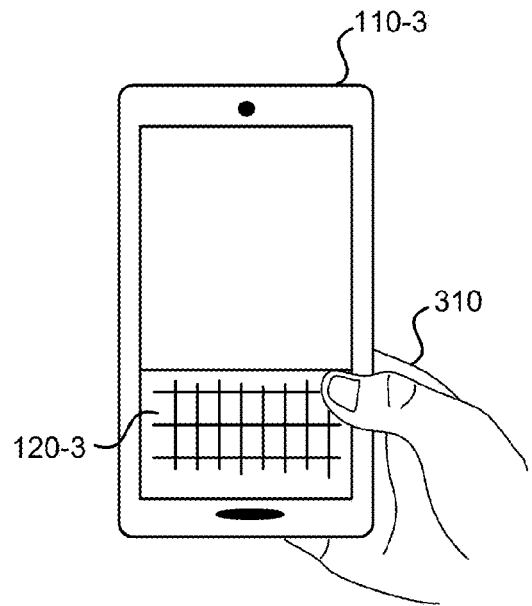
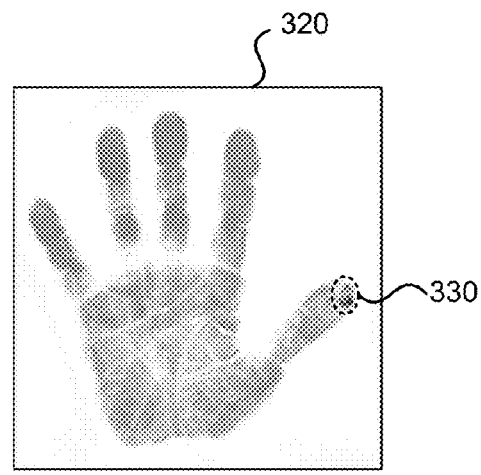
FIG. 3A    FIG. 3B
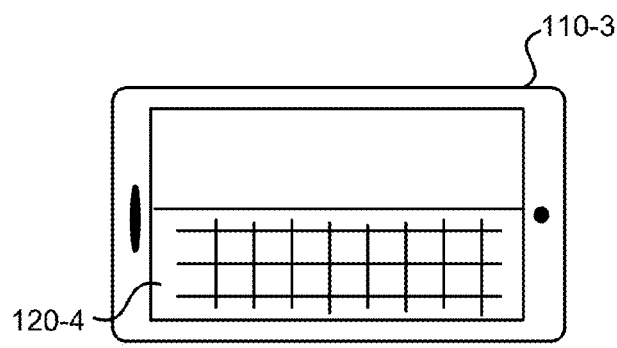
FIG. 4

DYNAMIC KEYBOARD AND TOUCHSCREEN BIOMETRICS

BACKGROUND

As electronic devices (e.g., smartphones, tablets, etc.) increasingly store and access personal/private data, the protection of such devices and data is becoming more critical. Current security measures (e.g., ID and password or PIN) provide limited protection because they are often reused and can be hacked, stolen, or forgotten. Security measures involving physiological biometrics (e.g., fingerprints, iris scans, etc.) offer increased security, but do not eliminate all security risks. For example, after initial authentication another person could fraudulently use the device if the device was lost or stolen, or if the user was coerced to authenticate.

SUMMARY

Embodiments of the present invention are directed toward providing ongoing authentication using biometric data. Fingerprints and/or other biometric data can be captured during the normal use of an electronic device, such as typing on a keyboard, and compared with associated reference biometrics to provide ongoing authentication to an application while the electronic device is being used. Comparison results may further be combined with additional physiological or behavioral biometrics to determine a level of authentication encompassing multiple biometric inputs and/or types.

An example method of authentication for an electronic device, according to the disclosure, includes capturing a plurality of biometric images in succession over a period of time with one or more sensors configured to capture the plurality of biometric images while a user is interacting with a user interface of the electronic device to input user data for a non-authentication operation. The method further includes, for each image of the plurality of biometric images, determining a key of the user interface associated with the capture of the image, and comparing the image with at least one reference image, based on the associated key. The method also includes providing information indicative of a result of the comparisons.

The method can include one or more of the following features. The information indicative of the result comprises information indicative of at least one of an authentication determination, a level confidence, or a binary result. Information indicative of the result can be provided to an application executed by the electronic device, used to determine an authentication, or both. The user interface can comprise a virtual keyboard on a touchscreen of the electronic device. The user interface can comprise a physical keyboard. Comparing each image of the plurality of biometric images with the at least one reference image can result in a plurality of comparisons, and the method can further comprise combining results of the plurality of comparisons into a single result. Comparing the image with the at least one reference image can include combining the image with at least one other biometric image of the plurality of biometric images into a composite image, and comparing the composite image with the at least one reference image. The method can further include capturing behavioral biometric data and comparing the captured behavioral biometric data with stored behavioral biometric data, where the information indicative of the result of the comparison further includes information indicative of the comparison of the captured behavioral biometric data with the stored behavioral biometric data. The method can further include combining (i) information regarding the comparison of each image of the plurality of biometric images with the at least one reference image and (ii) the comparison of the captured behavioral biometric data with the stored behavioral biometric data to create a combined comparison score. Capturing the plurality of biometric images can occur after an initial authentication using the electronic device.

An example device, according to the disclosure, can include a user interface, one or more sensors configured to capture a plurality of biometric images in succession over a period of time while a user is interacting with the user interface to input user data used for a non-authentication operation, and a processing unit communicatively coupled with the one or more sensors. The processing unit can be configured to, for each image of the plurality of biometric images, determine a key of the user interface associated with the capture of the image and compare the image with at least one reference image, based on the associated key. The processing unit can further be configured to provide information indicative of a result of the comparisons.

The example device can further include one or more of the following features. The device may include a touchscreen, wherein the user interface comprises a virtual keyboard on the touchscreen. The processing unit can be further configured to make a plurality of comparisons by the comparing of each image of the plurality of biometric images with the at least one reference image, and combine results of the plurality of comparisons into a single result. The processing unit can be configured to compare the image with the at least one reference image comprises by combining the image with at least one other biometric image of the plurality of biometric images into a composite image, and comparing the composite image with the at least one reference image. The processing unit can be configured to capture behavioral biometric data, and compare the captured behavioral biometric data with stored behavioral biometric data, where the information indicative of the result of the comparison can further includes information indicative of the comparison of the captured behavioral biometric data with the stored behavioral biometric data. The processing unit can be configured to combine (i) information regarding the comparison of each image of the plurality of biometric images with the at least one reference image and (ii) the comparison of the captured behavioral biometric data with the stored behavioral biometric data to create a combined comparison score. The processing unit can be configured to cause the one or more sensors to capture the plurality of biometric images after the device makes an initial authentication.

An example non-transitory computer-readable storage medium, according to the disclosure, can have instructions embedded thereon for providing authentication for an electronic device. The instructions can include computer code for capturing a plurality of biometric images in succession over a period of time with one or more sensors configured to capture the plurality of biometric images while a user is interacting with a keyboard of the electronic device to input user data used for a non-authentication operation, and, for each image of the plurality of biometric images determining a key of the user interface associated with the capture of the image and comparing the image with at least one reference image, based on the associated key. The instructions can further include computer code for providing information indicative of a result of the comparisons.

The example non-transitory computer-readable storage medium can further include one or more of the following features. Where the user interface comprises a virtual keyboard on a touchscreen of the electronic device, the instructions can further include computer code for displaying the virtual keyboard. The computer code for comparing each image of the plurality of biometric images with the at least one reference image can result in a plurality of comparisons, and instructions can further include computer code for combining results of the plurality of comparisons into a single result. The computer code for comparing the image with the at least one reference image can include computer code for combining the image with at least one other biometric image of the plurality of biometric images into a composite image and comparing the composite image with the at least one reference image. The instructions can further include computer code for capturing behavioral biometric data and comparing the captured behavioral biometric data with stored behavioral biometric data, where the information indicative of the result of the comparison further includes information indicative of the comparison of the captured behavioral biometric data with the stored behavioral biometric data. The non-transitory computer-readable storage medium can further include computer code for combining (i) information regarding the comparison of each image of the plurality of biometric images with the at least one reference image and (ii) the comparison of the captured behavioral biometric data with the stored behavioral biometric data to create a combined comparison score. The non-transitory computer-readable storage medium can further include computer code for providing the information indicative of the result of the comparison comprises computer code for providing an indication of whether a threshold level of authentication is met. The non-transitory computer-readable storage medium can further include computer code for capturing the plurality of biometric images occurs after an initial authentication using the electronic device.

An example apparatus, according to the disclosure, can include means for capturing a plurality of biometric images in succession over a period of time with one or more sensors configured to capture the plurality of biometric images while a user is interacting with a user interface of the apparatus to input user data used for a non-authentication operation. The apparatus can further include, for each image of the plurality of biometric images, means for determining a key of the user interface associated with the capture of the image; and means for comparing the image with at least one reference image, based on the associated key. The apparatus can further include means for providing information indicative of a result of the comparisons.

The apparatus can further include one or more of the following features. The user interface can include a virtual keyboard, further comprising means for displaying the virtual keyboard. The means for comparing each image of the plurality of biometric images with the at least one reference image are configured to cause a plurality of comparisons, further comprising means for combining results of the plurality of comparisons into a single result. The means for comparing the image with the at least one reference image can include means for combining the image with at least one other biometric image of the plurality of biometric images into a composite image and comparing the composite image with the at least one reference image. The apparatus can further include means for capturing behavioral biometric data and comparing the captured behavioral biometric data with stored behavioral biometric data, where the information indicative of the result of the comparison further includes information indicative of the comparison of the captured behavioral biometric data with the stored behavioral biometric data.

Items and/or techniques described herein may provide one or more of the following capabilities, as well as other capabilities not mentioned. Techniques can provide for ongoing authentication, increasing security and/or replacing current authentication schemes. This can allow application providers to outsource authentication to the electronic device. Also, because biometric data capture and authentication determination can occur during the natural use of an electronic device, it can also save application users the time and hassle of responding to additional authentication inquiries. These and other advantages and features are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3A is a drawing of a touchscreen device held in a user's hand, according to one embodiment.

FIG. 3B illustrates a reference image, which can be captured during an enrollment process and used during authentication, according to one embodiment.

FIG. 4 is a drawing of a touchscreen device held in a landscape orientation.

DETAILED DESCRIPTION

Figure 1:
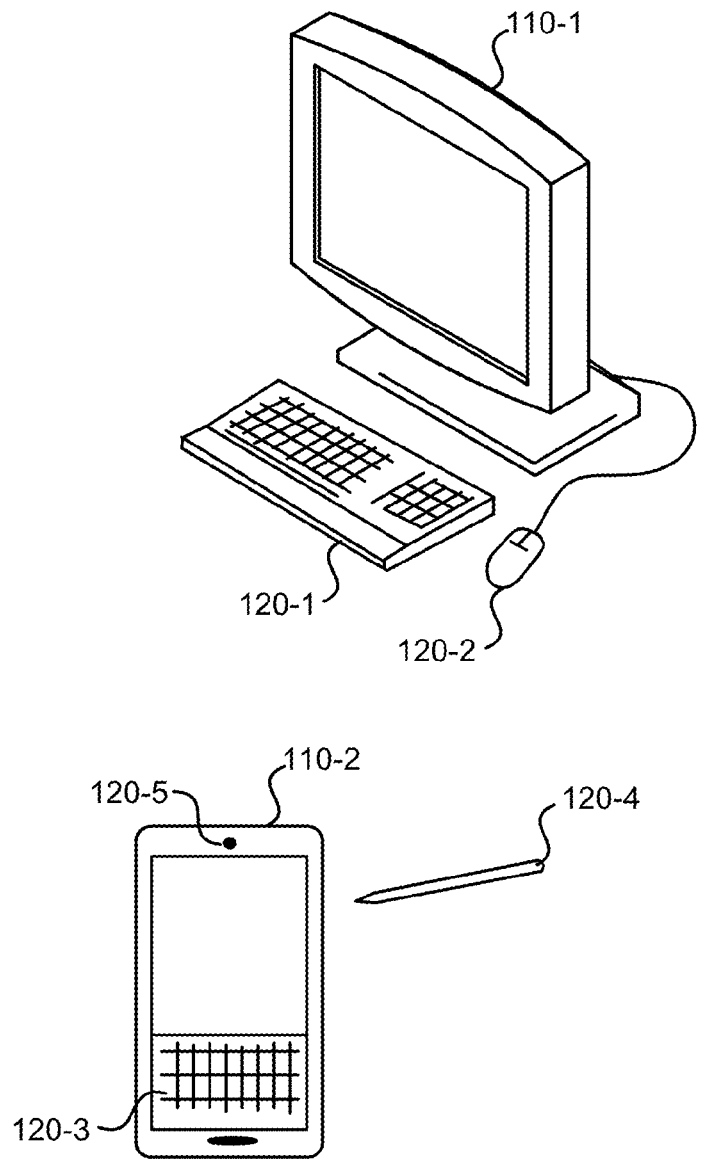
FIG. 1 is an illustration of examples of electronic devices that can utilize the techniques described herein.

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

Embodiments of the present invention are directed toward providing ongoing authentication during the normal use of an electronic device by capturing biometric data. Biometric data, such as physiological and/or behavioral data, can be extracted from sensor data during an enrollment or registration process and stored for use in authentication. To authenticate the user at a later point in time, the stored biometric data can be compared with newly-captured biometric data to provide a comparison result, or "score," that indicates a level of confidence that the newly captured biometric data matches the stored biometric data. This result can be used in an authentication determination. In some embodiments, the comparison results may be combined with additional biometrics and/or other information to determine a level of authentication encompassing multiple biometric inputs and/or types.

The techniques for authentication described herein can be utilized in a wide variety of electronic devices. Some such devices can include personal electronic devices such as personal computers, tablets, mobile phones, personal media players, video game systems, and the like. Moreover, embodiments may utilize a plurality of interconnected devices performing difference aspects of the techniques disclosed herein. For example, authentication can utilize data stored locally at a device and/or data communicated to the device from a separate device. Techniques may also be applied to government, commercial, and/or other types of electronic devices. Examples include Automatic Teller Machines (ATMs) and/or other kiosks.

FIG. 1 illustrates examples of electronic devices 110 that can utilize the techniques described herein. In particular, the electronic devices 110 include a personal computer 110-1 and a mobile phone 110-2. These electronic devices 110 may use any of a variety of software applications, operating systems, and other software and/or hardware features.

Electronic devices 110 can have a variety of mechanisms by which users can provide information to the electronic devices 110. These input mechanisms 120 can vary in form and function, depending on the desired functionality of the device, among other factors. Common input mechanisms include a physical keyboard 120-1, mouse 120-2, touchscreen 120-3 (which can include a graphical user interface (GUI), such as a virtual keyboard), stylus 120-4, camera 120-5, and the like. Embodiments of the invention can utilize one or more input mechanisms 120 to collect biometric information and determine a level of authentication during natural use of an electronic device 110 (i.e., while a user is using the input mechanisms to input data for a non-authentication purpose and/or operation).

In some embodiments, for example, finger-scanning sensors can be embedded in one or more keys of a physical keyboard 120-1 and/or at or near a surface of a mouse 120-2, stylus 120-4, and/or touchscreen 120-3. Depending on desired functionality, one or more finger scanning sensors may be embedded within a particular surface of a device. For example, in a mobile phone 110-2, a plurality of finger-scanning sensors may be embedded within all or a portion of the touchscreen 120-3, enabling for the scanning of a user's fingerprints as the user interacts with the touchscreen 120-3. Finger scanning sensors may be similarly embedded in or under surfaces of a mouse 120-2, stylus 120-4, or other input mechanism 120 and/or electronic device 110, including a power or ON/OFF switch of any of these input mechanisms 120 and/or electronic devices 110.

The technologies utilized in such finger-scanning sensors can vary, depending on desired functionality, manufacturing costs, and other concerns. Finger-scanning sensors can employ, for example, ultrasonic, infrared, and/or radio frequency (RF) fingerprint scanner technology, among others.

The camera 120-5 (which also can be utilized in electronic devices other than the mobile phone 110-2), can capture biometric information for authentication as well. A front-facing camera can, for example, capture images of a user as the user is interacting with the electronic device 110. These images can be compared with reference images to perform facial recognition, iris scans, and the like. As indicated in further detail below, biometric information from the camera may be combined with fingerprint and/or other biometric data for authentication.

It can be noted that although embodiments described herein often utilize a "keyboard" (physical or virtual), embodiments are not so limited. Authorization techniques can utilized any of a variety of input mechanisms 120, such as those shown in FIG. 1.

Figure 2:
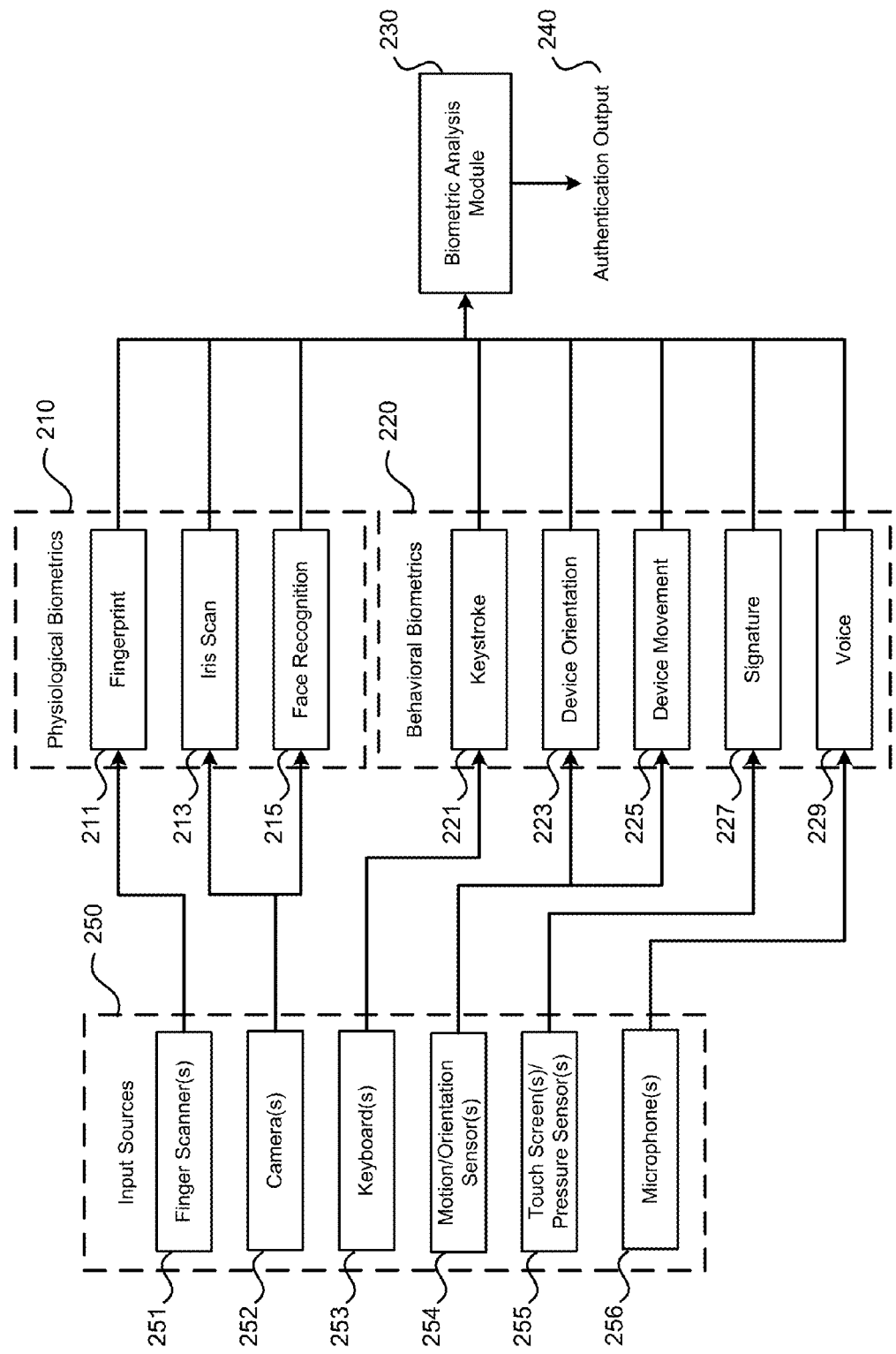
FIG. 2 is a block diagram illustrating input sources and other features that can be utilized in the techniques disclosed herein, according to one embodiment.

FIG. 2 is a block diagram illustrating input sources, biometrics, and other features that can be utilized in the techniques disclosed herein, according to one embodiment. It will be understood that the blocks shown are provided as an example. Other embodiments may omit, add, and/or substitute blocks. A person of ordinary skill in the art will recognize many variations. Components shown in FIG. 2 can be implemented using a variety of software and/or hardware incorporated into and/or communicatively coupled with an electronic device 110. An example of such software and/or hardware is described in more detail with regard to FIG. 8 below.

Generally speaking, techniques involve capturing biometric information during a user's natural use of an electronic device 110 using one or more input sources 250, and providing authentication information based on comparisons of the captured biometric information with reference biometric data. As explained in more detail below, the reference biometric data is obtained in an initial enrollment process. The authentication information can be provided to an application executed by the electronic device 110, which can then determine whether the authentication meets (or exceeds) a desired threshold for that application. If not, the application may respond by requiring the user to enter in additional authentication information or restricting access to certain functionality, for example. Thus, in addition or as an alternative to a password or some other initial authentication, techniques provided herein can provide additional unobtrusive authentication while an electronic device is in use. In some instances, for example, an application may require an initial authorization (such as entry of a password), then obtain subsequent ongoing authentication from the electronic device utilizing the techniques described herein.

Biometric information can be captured using information from a variety of input sources 150. As illustrated in FIG. 2, input sources 250 can include, but are not limited to, one or more finger scanners 251 (such as scanners utilizing ultrasonic, infrared, and/or radio frequency (RF) fingerprint scanner technology), cameras 252, keyboards 253 (including physical and touch screen keyboards), motion/orientation sensors 254 (such as gyroscopes, accelerometers, magnetometers, and the like), touch screens/pressure sensors 255, and/or microphones 256. It can noted, however, that although input sources 250 in FIG. 2 are indicated as providing information to determine certain biometric information, other embodiments may utilize information from the various input sources 250 differently. A person of ordinary skill in the art will recognize many variations.

Biometric information can be categorized as physiological biometrics 210 and behavioral biometrics 220. Physiological biometrics 210 can include biometrics based on unchanging (or relatively unchanging) physical characteristics of a user. As shown, physiological biometrics 210 can include fingerprint 211, iris scans 213, face recognition 215, and the like. Physiological biometrics 210 may be captured by using information from one or more input sources 250, including sensors and/or devices incorporated into and/or communicatively connected with the electronic device 110. These input sources 250 can be incorporated into the device such that they are able to capture biometric data during the natural use of the electronic device (e.g., while the user is looking at a display or using an input mechanism 120 of the electronic device to enter data for a non-authentication purpose).

Behavioral biometrics 220 can include biometrics based on behaviors of a user that can be used to determine the user's identity. Keystroke 221 is a behavioral biometric based on how the user interacts with keys and/or other buttons on a physical or virtual keyboard, keypad, or other user interface with buttons. Keystroke 221 can take into account one or more of: latencies between successive keystrokes, keystroke durations, applied pressure on keys, typing speed, and the like. Additionally or alternatively, as explained in further detail below, keystroke 221 may include a determination of which fingers are used when pressing the keys. For electronic devices with touchscreens, a behavioral biometric based on touch may include similar aspects of touch-based interaction a user makes with the touchscreen. Keystroke 221 may be based on output from touch and/or pressure sensors, as well as the timing of such output and/or one or more reference images of a user's fingers, for example.

Device orientation 223 is a behavioral biometric for electronic devices 110 and/or input mechanisms 120 that are held by a user. For example, different users may hold a particular electronic device 110 (e.g., a mobile phone) at different angles. These angles can be measured by, for example, motion/orientation sensor(s) 254 (e.g., accelerometers, magnetometers, etc.) of an electronic device 110 and/or input mechanism 120. Thus, device orientation 223 can be a behavioral biometric used in authentication.

Device movement 225 is behavioral biometric that can also can be used in the identification of a user. For example, motion/orientation sensor(s) 254 (e.g., accelerometers, gyroscopes, magnetometers, etc.) of a mobile device can be used to determine a pattern of movement when a user is walking or engaged in another activity. This pattern can be compared with one or more reference patterns to determine an identity of the user. Thus, device movement 225 can be a behavioral biometric used in authentication.

Signature 227 and voice 229 are other behavioral biometrics that can be used for authentication. Signature 227 can be captured by a touch screens/pressure sensors 255, including a touchscreen or touchpad of the electronic device. Voice 229 can be captured by microphone(s) 256.

Data from all or a portion of the physiological biometrics 210 and/or behavioral biometrics 220 can be provided to a biometric analysis module 230 for analysis. The analysis can involve a comparison of the biometric data with corresponding reference data. The reference data can include biometric data previously captured from the user during an enrollment process.

Enrollment of biometric information can vary, depending on desired functionality, capabilities of the electronic device, and/or other factors. The enrollment process may be initiated by an application executed on the electronic device to establish reference data for later use in authentication. For example, if a device has a standard-sized physical keyboard on which a user typically types using all 10 fingers, an enrollment process may enable the user to "register" all 10 fingers by scanning each finger. If the user only uses both index fingers or both thumbs to type, or uses only one index finger or one thumb to type (or otherwise interact with the electronic device 110 and/or input mechanism 120) the use may register only those fingers. The enrollment of fingers can use a nail-to-nail rolled print so that any part of the print can later be used for identification. Additionally or alternatively, the enrollment of fingers may involve capturing multiple images of a partial fingerprint (for example, during the enrollment process while the user is typing) that are "stitched" together to form a reference image used for subsequent identification. Similarly, the enrollment of an iris scan 213 and/or face recognition 215 may involve capturing reference images of the user's eyes and/or face.

Enrollment of behavioral biometrics 220 can include asking the user to use the electronic device 110 in a natural manner, thereby mimicking conditions in which later authentication can be made. For example, the enrollment process may ask the user to type in a phrase or sentence, and capture keystroke, device orientation, and/or device movement data while the user is typing. (The user may be asked to type the phrase or sentence multiple times to help ensure the data is accurate.) Similarly, the user may be asked to input his or her signature and/or say a phrase to gather signature and/or voice data during enrollment.

Enrollment may also be used to determine associations between different biometrics. For example, a user may hold an electronic device 110 differently when interacting with the device's touchscreen than when simply holding the electronic device 110 with no interaction. This association may be determined during the enrollment process and used in subsequent authentication. Similarly, fingerprints may be captured while a user is typing a phrase or sentence during enrollment to determine which fingers and/or which parts of a finger a user uses when pressing a particular key. FIGS. 3A-4 help further illustrate this point.

FIG. 3A is a drawing of a touchscreen device 110-3 held in a user's hand 310. Here, the user interacts with a virtual keyboard 120-3 of the touchscreen device 110-3 by touching a key of the virtual keyboard 120-3 with a portion of the user's right thumb. A fingerprint scanning device embedded under the touchscreen of the device 110-3 can capture an image of the portion of the user's right thumb that touched the key. During the enrollment process, the user's right thumb and/or the portion of the user's right thumb that came in contact with the key can be associated with that key. This can enable authentication based on which fingers are used to select certain keys. One or more images of the fingers, in their entirety, may also be captured and stored for reference.

FIG. 3B illustrates a reference image 320, which can be captured or otherwise obtained during an enrollment process and used during subsequent authentication, according to one embodiment. For example, during authentication, the electronic device 110 may capture images of the user's fingers and compare the captured images with the previously-obtained reference image to determine how closely the captured images match with the reference image 320. This comparison can be made using software and/or hardware components of the electronic device 110, such as the biometric analysis module 230 of FIG. 2.

Although the reference image 320 in this example comprises an image of the user's right palm, embodiments may vary depending on desired functionality. For example, one or more images of individual fingers and/or parts of fingers may be used as reference images. In some embodiments, reference images may be imported from other devices, and thus, reference images would not necessarily be limited to the image-capturing capabilities of the touchscreen device 110-3. Moreover, although embodiments are described as using "images," embodiments are not so limited. Embodiments may capture, store, and/or compare data other than images (e.g., data extracted from an image).

Depending on the desired functionality, the reference image 320 may not only be used in a comparison of features (e g, minutia) with a captured image, but may also be used to determine which finger and/or portion of a finger was used when the captured image was captured. For example, if a user presses a key using an outer portion of his or her right thumb, as shown in FIG. 3A, the touchscreen device 110-3 can capture an image of the corresponding portion 330 of the right thumb and compare it with the reference image 320 to determine which finger and/or portion of a finger was used to press they key. This can additionally or alternatively be compared with information regarding the finger and/or portion of a finger associated with that key during the enrollment process to produce a comparison result. As discussed in further detail below, this comparison result can be "fused" or otherwise combined with other biometric comparison results to establish a level of authentication.

Although the embodiments described in relation to FIGS. 3A and 3B are in reference to a mobile device with a virtual keyboard 120-3, other embodiments are not so limited. The techniques described in relation to FIGS. 3A and 3B can be applied to other electronic devices 110 with other input mechanisms 120, such as a personal computer or tablet with a physical keyboard 120-1, a touchscreen device with a graphical user interface other than a virtual keyboard 120-3, and so forth.

Embodiments may further allow for electronic devices 110 and/or input mechanisms 120 having more than one mode of operation. For example, the touchscreen device 110-3 of FIG. 3A may alter its interface when operating on its side in a "landscape" orientation, as shown in FIG. 4, providing an expanded virtual keyboard 120-4 rather than the virtual keyboard 120-3 illustrated in FIG. 3A. Because this can alter the way in which a user interacts with the touchscreen device 110-3 (e.g., there are different finger-key associations for the expanded virtual keyboard 120-4 than for the "normal" virtual keyboard 120-3). Accordingly, the touchscreen device 110-3 may have a separate enrollment process (and, correspondingly, a different set of reference data used in the authentication process) when the touchscreen device is operating in a landscape orientation.

Referring again to FIG. 2, data from all or a portion of the physiological biometrics 210 and/or behavioral biometrics 220 can be provided to a biometric analysis module 230 for analysis, as previously indicated. The analysis can involve a comparison of the biometric data with corresponding reference data to provide a comparison result. The biometric analysis module can then provide an authentication output 240 indicative of the comparison result. The authentication output 240 can be a measure of confidence that captured biometric data matches with reference biometric data. Additionally or alternatively, the authentication output 240 may include a measure of confidence that the user has been identified, based on the matches (or lack thereof). In some embodiments, the biometric analysis module 230 may operate at a device level, as an intrinsic feature of the electronic device 110, providing the authentication output 240 to an application layer (e.g., operating system, software application, etc.) of the electronic device 110.

Figure 5:
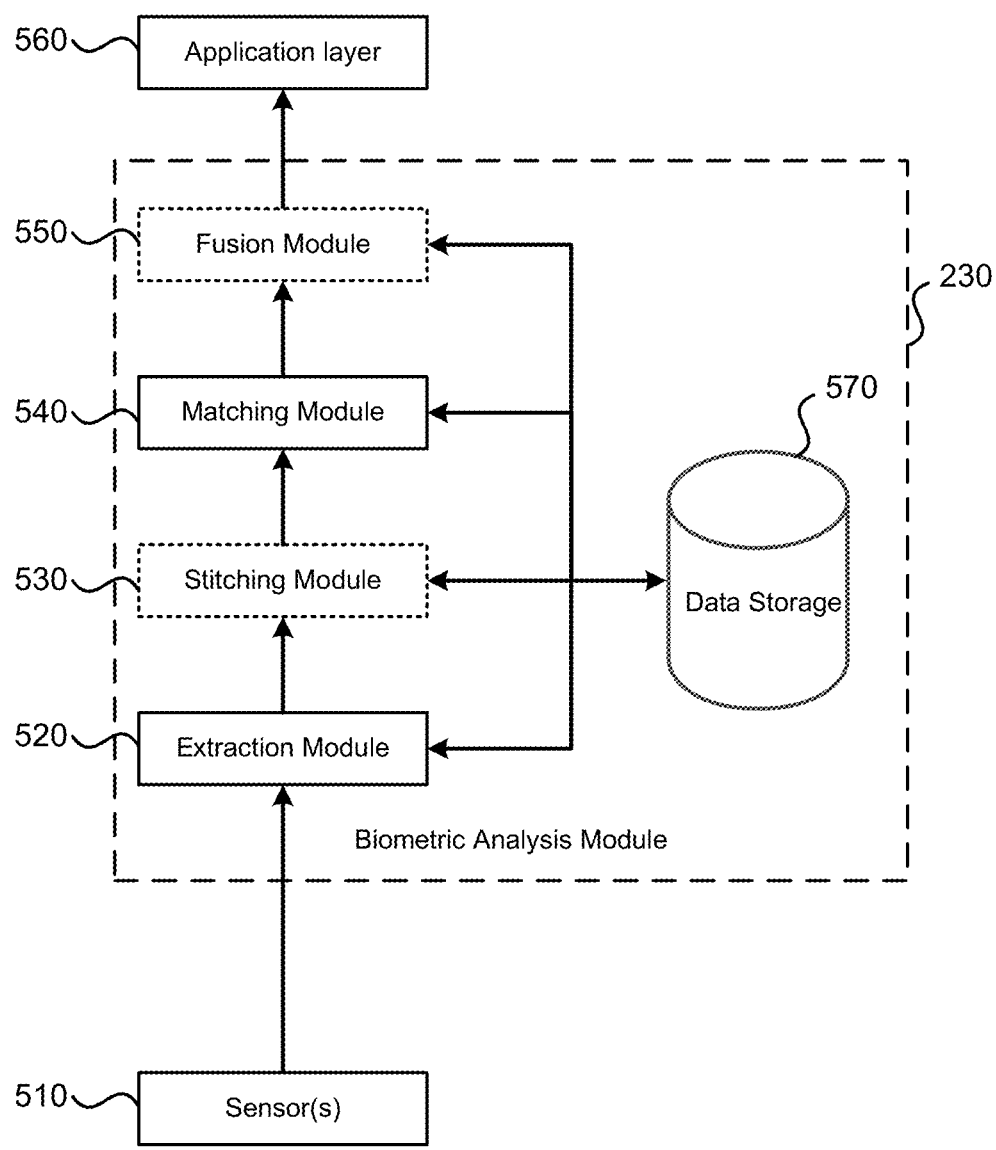
FIG. 5 is a block diagram illustrating components of the biometric analysis module of FIG. 2, according to one embodiment.

FIG. 5 is a block diagram illustrating components of the biometric analysis module 230, according to one embodiment. As with other figures herein, embodiments of a biometric analysis module may vary from FIG. 5 by adding, omitting, rearranging, and/or substituting components. Components can, for example, appear in different order and still achieve the same or similar end functionality. A person of ordinary skill in the art will recognize many variations. As with FIG. 2, components shown in FIG. 5 can be implemented using a variety of software and/or hardware means incorporated into and/or communicatively coupled with an electronic device 110. Examples of such means are described in more detail with regard to FIG. 8 below.

In this embodiment, one or more sensor(s) 510 provide sensor data to an extraction module 520 of the biometric analysis module 230. Such sensor(s) can include, for example, the input sources 250 described in relation to FIG. 2, which can be integrated into and/or communicatively coupled with an electronic device 110. The extraction module 520 can then extract biometric data (e.g., physiological biometrics 210 and or behavioral biometrics 220 as shown in of FIG. 2) from the sensor data. That is, raw sensor data provided by the sensor(s) 510 may be processed to extract and/or determine features of the data indicative of physiological and/or behavioral biometrics. (For example, fingerprint data from the sensors 510, for example, can be processed and stored as minutia.) During the enrollment process, the extracted biometric data can be sent to the data storage for use as reference data. The stored data can be stored using any type of data structure, such as a database, file system, and the like, which can be stored in the data storage 570, described in more detail below. During authentication, the extraction module 520 can extract biometric data from the newly-captured sensor data for comparison with the reference data.

Embodiments may optionally utilize a stitching module in which multiple samples of biometric data are combined before comparison with reference data. For example, multiple captured images of a partial fingerprint may be "stitched" together to form a composite image of the fingerprint, which may be compared with a reference image.

A standard full size keyboard on which a user may normally type with 10 fingers, for instance, may have finger/key associations determined as follows:

1) The right index finger may be associated with keys: YUHJNM

2) The right middle finger may be associated with keys: IK,

3) The right ringer finger may be associated with keys: OL.

4) The right little finger may be associated with keys: P;/

5) The left index finger may be associated with keys: RTFGYB

6) The left middle finger may be associated with keys: EDC

7) The left ringer finger may be associated with keys: WSX

8) The left little finger may be associated with keys: QAZ

Images taken by image scanners at the YUHJNM keys, for example, could be stitched together (i.e. amalgamated) to create a composite image of the right index finger print and used for authentication against a reference image of the right index finger. Images from other keys could be combined in a similar fashion for other fingers.

On a device keyboard where keys are normally typed with 2 thumbs, as shown in FIGS. 3A-4, finger/key associations may be determined as follows 1) The right thumb may be associated with keys: YUIOPHJKLBNM.

2) The left thumb may be associated with keys: QWERTASDFGZXCV

Again, images captured from keys associated with a certain thumb may be stitched together to create a composite image to use for authentication. As noted above with regard to FIG. 4, different modes of operation may have different key finger/key associations. Furthermore for devices used my multiple users, different users may have different finger/key associations. Additional details regarding such stitching are provided below with regard to FIGS. 6A and 6B.

The matching module 540 is utilized during authentication to compare captured biometric data received from the extraction module 520 (or stitching module 530) with reference biometric data stored in data storage 570. For example, the matching module 540 may compare a captured image of a fingerprint with a reference image of a fingerprint using a comparison of minutia and/or traditional image processing techniques to determine whether there is or is not a match and/or an a level of confidence regarding whether there is or is not a match. An indication of whether there is a match or not a match and/or a level of confidence can be provided as a measurement of authentication (e.g., as a number within a specified range, a binary indicator, an indexed variable, etc.) to an application layer 560. Optionally it may first be provided to a fusion module 550.

The fusion module 550 is a module configured to combine multiple comparison results. Depending on the techniques used, the fusion module 550 may combine multiple comparison results of a single type of biometric input (e.g., combine comparison results of multiple fingerprints 211, which can include fingerprints of the same and/or different fingers), comparison results of several types of biometric input (e.g., combine comparison results of fingerprints 211, keystroke 221, and device orientation 223), or both.

Techniques for combining multiple comparison results can vary, and may depend on the type of comparison results combined, desired authentication accuracy, and/or other factors. Techniques may include, for example, weighted or non-weighted averaging, score-based combining, Boolean combinatorial logic (e.g., a Boolean AND, OR, etc.), and the like. More sophisticated means can include Neyman-Pearson techniques and variants for combining random statistical events in an optimized manner. Additionally or alternatively, embodiments may utilize optimized multi-modal fusion techniques for combining orthogonal and/or non-orthogonal statistical events. Examples of such multi-modal fusion are provided in U.S. Pat. No. 7,287,013 entitled "Multimodal Fusion Decision Logic System," U.S. Pat. No. 8,190,540 entitled "Multimodal Fusion Decision Logic System For Determining Whether To Accept A Specimen," U.S. Pat. No. 7,440,929 entitled "Multimodal Authorization Method, System And Device," and U.S. Pat. No. 7,558,765 entitled "Multimodal Fusion Decision Logic System Using Copula Model," all of which are incorporated by reference herein.

The output of the biometric analysis module 230 (e.g., the authentication output 240 of FIG. 2), provided by the matching module 540 or the fusion module 550 can comprise an indication of a confidence and/or authentication level of the biometric data extracted from the sensor(s) 510. This can be provided to the application layer 560 of the electronic device 110, such as an operating system, software application, or other program executed by the electronic device 110. Based on the level of authentication attained, the application layer 560 can determine how to respond. For example, if the level of authentication indicated by the biometric analysis module 230 is below a certain threshold, the application layer 560 may restrict access to certain functions of an application and require additional input (e.g., a password, signature, finger or eye scan, etc.).

As previously indicated, techniques provided herein can be implemented during the natural use of an electronic device, to input user data used for a non-authentication operation. Thus, the sensor data captured by the sensor(s) 510 and the resulting authentication output provided by the biometric analysis module (230) can occur as background functions as a user is using an electronic device. An application executed at the application layer 560 can determine how often to utilize the authentication information, as well as the desired level of authentication. For example, a banking application executed by an electronic device 110 may, after initially requesting login and password information from a user, require subsequent authentication, which can be provided using the techniques discussed herein. Thus, on a periodic and/or event-driven basis, the banking application may receive authentication information from the biometric analysis module 230 to determine whether a minimum level of authentication is maintained. The minimum threshold of authentication can vary on application and/or functionality within an application. For example, a banking application may require a higher level of authentication than a shopping application. Furthermore, the banking application may require a lower threshold of authentication when a user wants to transfer $10 than when the user wants to transfer $10,000.

Figure 6A:
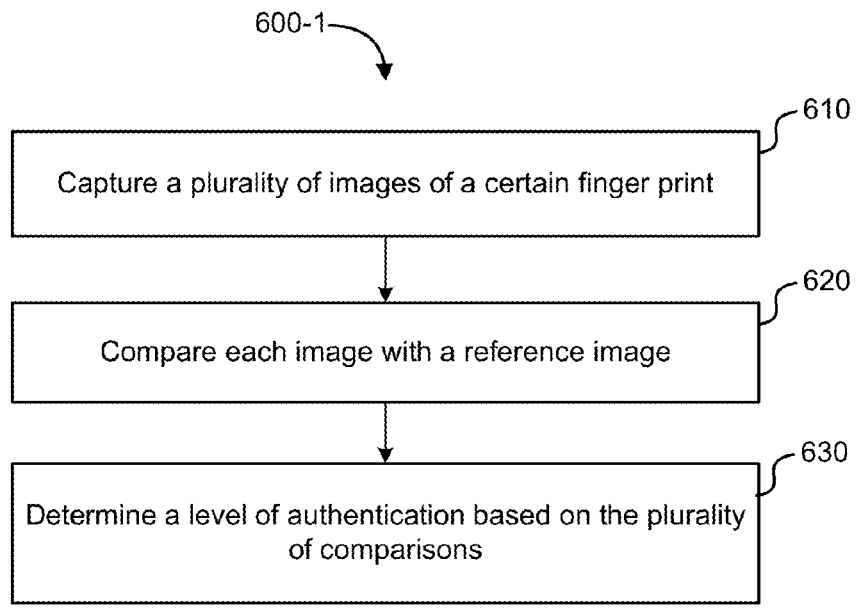
FIGS. 6A and 6B illustrate different methods of biometric analysis.
Figure 6B:
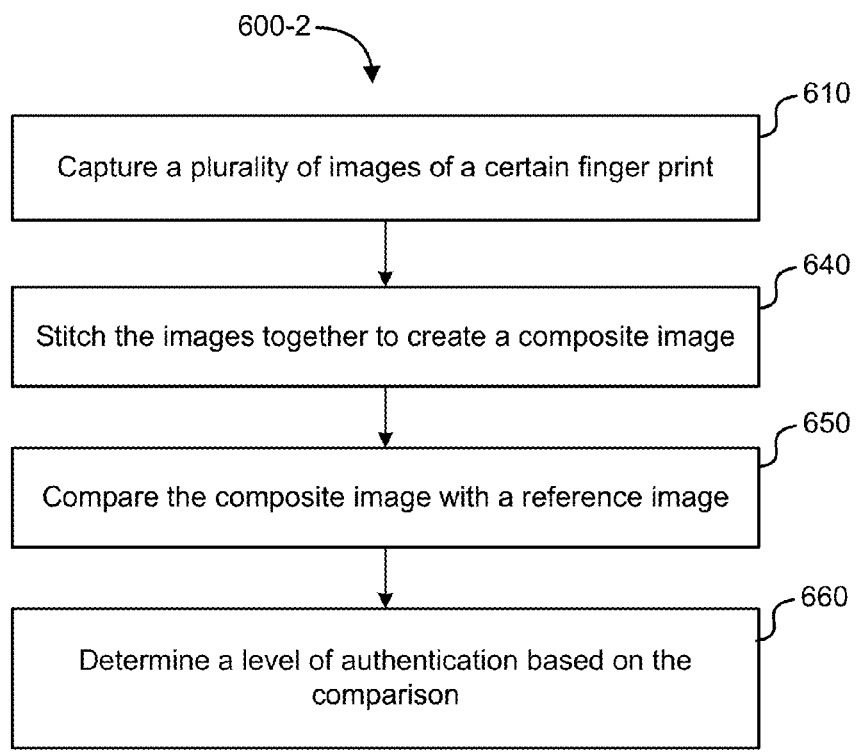

FIGS. 6A and 6B are flow diagrams that help illustrate the concept of stitching. FIG. 6A is a flow diagram of a method 600-1 of biometric analysis that does not employ stitching. The method 600-1 may be implemented by an electronic device, which may include one or more of the components shown in FIG. 5.

At block 610, a plurality of images (e.g., fingerprints) of a certain finger print are captured. The images can comprise image captures of, for example, an index finger pressing the "h" key of a physical or virtual keyboard. As indicated in FIG. 5, the image captures can be extracted from sensor data from one or more sensor(s) 510 embedded in the physical or virtual keyboard. It can be further noted that the plurality of images can be captured on a rolling basis such that an image comparison is conducted using a "window" of captured images (e.g., using the last 5 captured fingerprints of a finger), which can be updated with each new captured image. Thus, a single image may be used in more than one image comparison. (For example, a window of the last 5 captured fingerprints may include 4 fingerprints used in a previous image comparison, and a newly-captured fingerprint.) Some embodiments may additionally or alternatively employ image capture that is not on a rolling basis (e.g., after one image comparison, capture 5 new images for the next image comparison).

At block 620, each captured image is compared with a reference image. The comparison can be made, for example, by a matching module such as the matching module 540 shown in FIG. 5. Also, reference images may be stored in a memory, such as the data storage 570 of FIG. 5. In this method 600-1, images can be compared with the reference image even if lacking many identifiable features. Thus, images comprising partial fingerprints can be compared with reference images. Because a partial fingerprint may have less identifiable features (e.g., minutiae) than a complete fingerprint, the corresponding level of confidence that the partial fingerprint matches a reference fingerprint may be lower.

At block 630, a level of authentication based on the plurality of comparisons is determined. The level of authentication can comprise a level of confidence that captured images match reference image, accounting for results of the plurality of comparisons by combining them using any of a variety of combining techniques (e.g., averaging, Boolean combining, Neyman-Pearson techniques, multi-modal fusion, etc.).

FIG. 6B is a flow diagram of another method 600-2 of biometric analysis that utilizes stitching. As with the method 600-1 of FIG. 6A, the method 600-2 may be implemented by an electronic device, which may include one or more of the components shown in FIG. 5.

Block 610 echoes block 610 of method 600-1. That is, a plurality of images of a certain finger print are captured. Here, however, images are stitched together to create a composite image, at block 640, which is then compared with a reference image at block 650. As indicated previously, embodiments may also create the reference image using a similar stitching process during an enrollment phase.

Methods of stitching can vary, depending on desired functionality. For example, a second captured image may be "stitched" to a first captured image to create a composite image when it is determined that the second captured image includes features (e.g., minutiae) that are not included in the first image. Subsequently-captured images can be similarly stitched to the composite image when it is determined that they include features not found in the current composite image. The comparison of the composite image with the reference image (at block 650) can occur periodically and/or based on triggering events, such as when it is determined that the composite image includes a threshold number of minutiae or other features. Finally, at block 660, a level of authentication based on the comparison of the composite image with the reference image is determined.

As with other methods described herein, alternative embodiments may include alterations to the embodiments shown in FIGS. 6A and 6B. Components of the methods 600, although illustrated in a particular order, may be performed in a different order and/or simultaneously, according to different embodiments. Furthermore, although embodiments discussed in relation to the methods 600 shown in FIGS. 6A and 6B discussed stitching and/or matching of fingerprint images, embodiments may be extended to other types of data and/or biometrics. A person of ordinary skill in the art will recognize many additions, omissions, and/or other variations.

Figure 7:
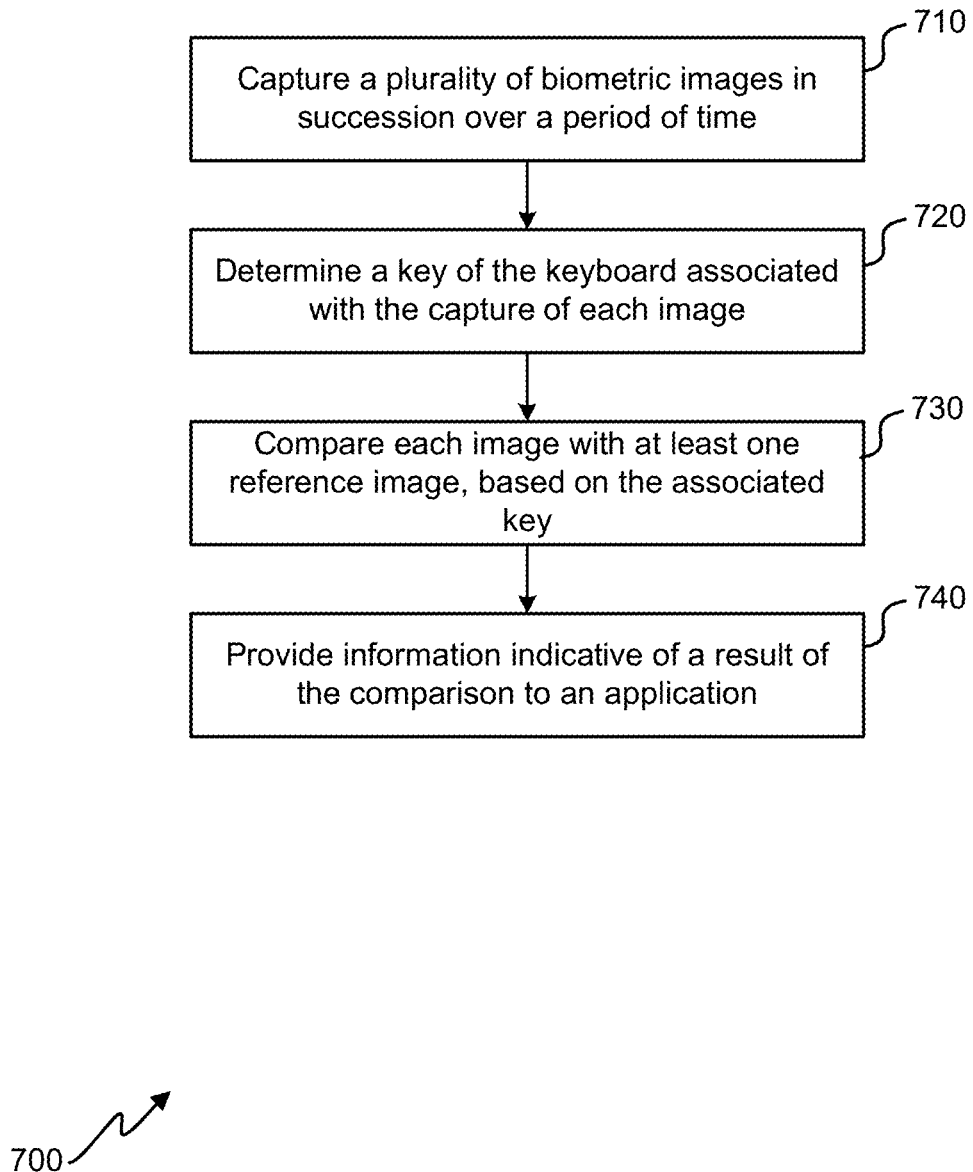
FIG. 7 illustrates an embodiment of a method of authentication for an electronic device.

FIG. 7 illustrates an embodiment of a method 700 of method of authentication for an electronic device. Means for performing one or more of the components of the method 700 can include hardware and/or software means described in further detail in relation to FIG. 8, which may also be described functionally as shown in FIGS. 2 and 5. Alternative embodiments may include alterations to the embodiments shown. Components of the method 700, although illustrated in a particular order, may be performed in a different order and/or simultaneously, according to different embodiments. Moreover, a person of ordinary skill in the art will recognize many additions, omissions, and/or other variations.

At block 710, a plurality of biometric images are captured in succession over a period of time. The biometric images can include, for example, fingerprints captured over a period of time by one or more sensors configured to capture the plurality of biometric images while a user is interacting with a keyboard of the electronic device. The user's interaction may be part of the user's natural use of the electronic device, and not part of a specific authentication program. That is, the plurality of biometric images may be captured as a "background" feature of the electronic device.

At block 720, a key of the keyboard associated with the capture of each image is determined. This can be based on the location of an image-capturing sensor. For example, on a physical keyboard, each key may have one or more image-capturing sensors. On a virtual keyboard, one or more sensors may be located under a portion of a touchscreen illustrating a particular key.

At block 730, each biometric image of the plurality of biometric images is compared with at least one reference image. In some embodiments, this comparison is based on the associated key. This allows the electronic device to focus its comparison of a fingerprint to a reference fingerprint of a finger associated with the key. As detailed above, different keys of a keyboard (and/or other buttons or features of an input mechanism or user interface) may be associated with a user's finger during the enrollment process. In one example where thumbs are used to type, the right thumb may be associated with keys YUIOPHJKLBNM, and the left thumb may be associated with keys QWERTASDFGZXCV. These associations may be stored so that during authentication, as shown at block 730, a captured image associated with a particular key may be compared with a reference image of a finger associated with that key. In this manner, the comparison can measure both physiological biometrics (the fingerprint) and behavioral biometrics (the association of the finger with the key).

As indicated previously, comparing each biometric image with a reference image can include comparing the images, individually, with the reference image, or "stitching" them to create a composite image, which is compared with the reference image. In the example where thumbs are used to type, for instance, image captures from any of the keys YUIOPHJKLBNM may be compared individually with a reference image of the right thumb, or may be combined to create a composite image of the right thumb, which can then be compared with the reference image.

At block 740, information indicative of a result of the comparison is provided to an application. As previously indicated, the comparison of a captured image with a reference image can provide a comparison result, which can be a measure of confidence that the two images match and/or that the identity of the user has been verified. An indication of the result is provided to an application (as, for example, a quantifiable metric of authentication). With this measure of authentication, the application may alter its functionality accordingly by, for example, preventing a user of the electronic device from accessing certain functions of the application when the authentication fails to meet a desired threshold, requesting additional authentication from the user (e.g., asking the user to enter a password), and the like.

Depending on desired functionality, the method 700 of FIG. 7 can include a wide range of variations. For example, the method may include separately capturing behavioral biometric data, such as any of the behavioral biometrics 220 shown in FIG. 220, comparing the captured behavioral biometric data with stored behavioral biometric data, and accounting for this comparison in the information indicative of the result of the comparison, provided at block 740. The information indicative of the result of the comparison may include separate authentication metrics for the image comparison of method 700 and the separate behavioral biometrics, or it may include a combination of comparison results (as, for example, a combined comparison score). The combination of different biometrics can be made using the techniques described herein (e.g., Boolean combining, Neyman-Pearson techniques, multi-modal fusion, etc.)

Additionally or alternatively, the information indicative of the result of the comparison provided at block 740 may include an indication of whether a threshold level of authentication is met. That is, instead of providing an application with a level of authentication that the application can use, the functionality provided herein can further include determining whether a threshold level of authentication has been met. In such cases, an application may then simply inquire whether a threshold level of authentication has been met, and receive from the electronic device a binary answer.

Optionally, as suggested above, the method 700 of FIG. 7 may be utilized after an initial authentication has occurred using the electronic device. For example, an application may initially require a user to enter a password, signature, or other authenticating biometric. After this initial authentication has occurred, the application may then rely on the authentication provided by the method 700 of FIG. 7 for ongoing authentication information.

Figure 8:
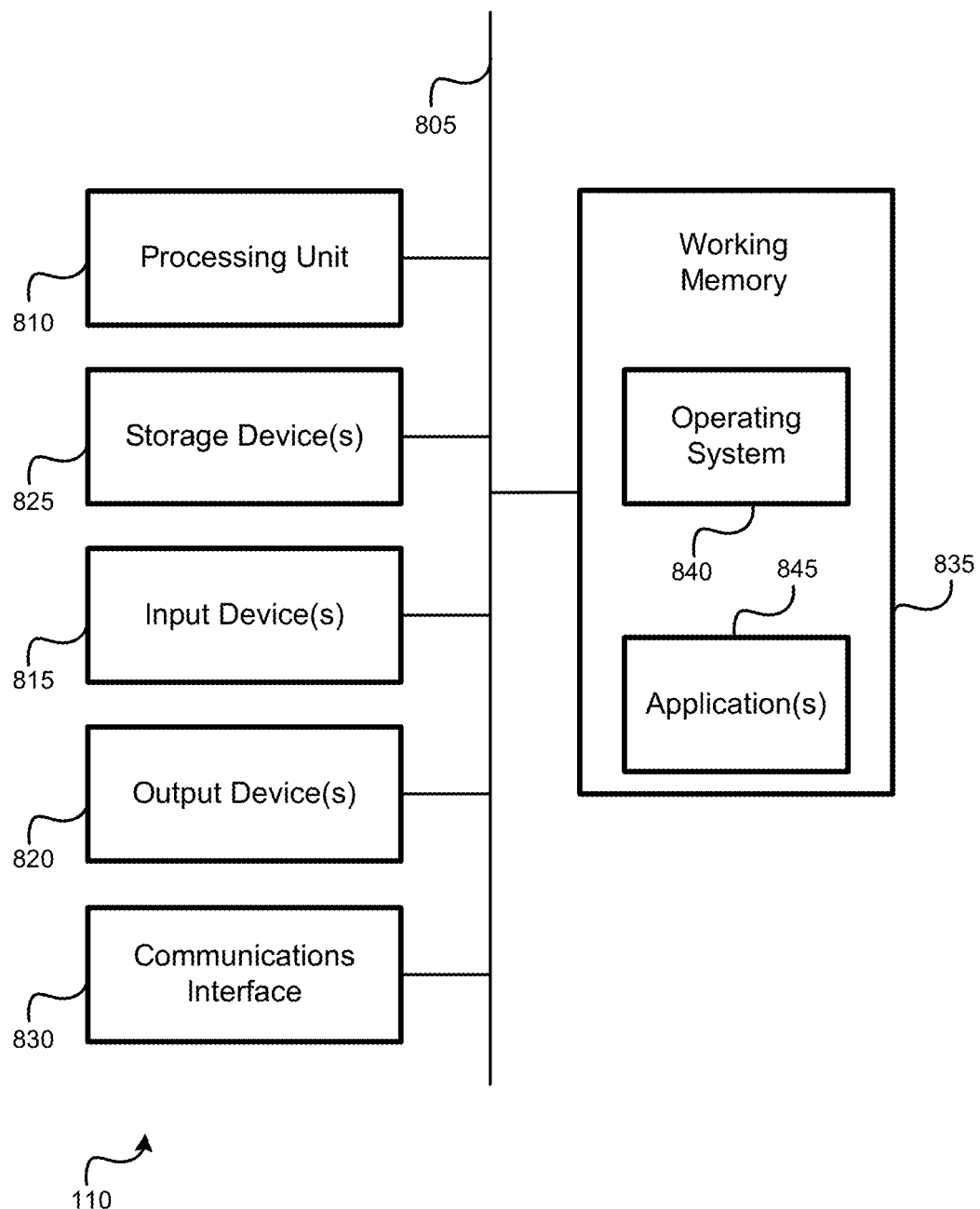
FIG. 8 illustrates components of an embodiment of an electronic device.

FIG. 8 illustrates components of an electronic device 110, according to one embodiment, which can implement the authentication techniques discussed herein including the components illustrated in FIGS. 2 and 5, as well as the methods described in FIGS. 6A-7. It should be noted that FIG. 8 is meant only to provide a generalized illustration of various components, any or all of which may be utilized as appropriate. Moreover, system elements may be implemented in a relatively separated or relatively more integrated manner.

The electronic device 110 is shown comprising hardware elements that can be electrically coupled via a bus 805 (or may otherwise be in communication, as appropriate). The hardware elements may include a processing unit 810, including without limitation one or more general-purpose processors and/or one or more special-purpose processors (such as digital signal processing chips, graphics acceleration processors, and/or the like); one or more input devices 815 can include the input mechanisms 120 as illustrated in FIG. 1. This can include without limitation camera(s), a touchscreen, a touch pad, microphone, a keyboard, a mouse, button(s), dial(s), switch(es), and/or the like; and one or more output devices 820, which can include without limitation a display device, a printer, display, light emitting diode (LED), speakers, and/or the like.

Input devices 815 can further include one or more sensors (such as the sensor(s) 510 of FIG. 5. Such sensors can include, without limitation, one or more accelerometer(s), gyroscope(s), camera(s), magnetometer(s), altimeter(s), microphone(s), proximity sensor(s), light sensor(s), and the like. These sensors can be integrated into other input devices 815 (e.g., input mechanisms 120 of FIG. 1) and/or portions of the electronic device 110 in such a manner as to be able to capture data from which biometric data (physiological and/or behavioral) can be extracted.

The electronic device 110 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like. For example, the non-transitory storage devices 825 may be used to implement the data storage 570 of FIG. 5.

The electronic device 110 can also include a communications interface 830, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The subcomponents of the interface may vary, depending on the type of electronic device 110 (e.g., mobile phone, personal computer, etc.) The communications interface 830 may permit data to be exchanged with a data network, other computer systems, and/or any other devices described herein.

Embodiments in which the electronic device 110 is a mobile device may also include a Satellite Positioning System (SPS) receiver (not shown), such as Global Positioning System (GPS) capable of receiving signals from one or more SPS satellites. Such positioning can be utilized to complement and/or incorporate the techniques described herein. It can be noted that an SPS may include any combination of one or more global and/or regional navigation satellite systems and/or augmentation systems, and SPS signals may include SPS, SPS-like, and/or other signals associated with such one or more SPS.

In many embodiments, the electronic device 110 will further comprise a working memory 835, which can include a RAM or ROM device, as described above. Software elements, shown as being currently located within the working memory 835, can include an operating system 840, device drivers, executable libraries, and/or other code, such as one or more application programs 845, which may comprise software programs provided by various embodiments, and/or may be designed to implement methods, and/or configure systems, provided by other embodiments, as described herein, such as some or all of the components shown in FIGS. 2 and 5, as well as methods shown in FIGS. 6A-7. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as electronic device 110. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by the electronic device 110 and/or might take the form of source and/or installable code, which, upon compilation and/or installation on the electronic device 110 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the electronic device 110) to perform methods in accordance with various embodiments of the invention. According to a set of embodiments, some or all of the procedures of such methods are performed by the electronic device 110 in response to processing unit 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processing unit 810 to perform one or more procedures of the methods described herein.

The terms "machine-readable medium" and "computer-readable medium," as used herein, refer to any medium that participates in providing data that causes a machine to operate in a specific fashion. In an embodiment implemented using the electronic device 110, various computer-readable media might be involved in providing instructions/code to processing unit 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media includes, without limitation, dynamic memory, such as the working memory 835.

Various forms of computer-readable media may be involved in carrying one or more sequences of one or more instructions to the processing unit 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the electronic device 110.

The communications interface 830 (and/or components thereof) generally will receive signals, and the bus 805 then might carry the signals (and/or the data, instructions, etc. carried by the signals) to the working memory 835, from which the processing unit 810 retrieves and executes the instructions. The instructions received by the working memory 835 may optionally be stored on a non-transitory storage device 825 either before or after execution by the processing unit 810.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of authenticating a user of an electronic device, the method comprising:
   capturing, by one or more sensors of the electronic device, a plurality of biometric images in succession over a period of time while the user is interacting with a user interface of the electronic device to input user data for a non-authentication operation;
   for each image of the plurality of biometric images: (1) determining, by a processor of the electronic device, a key of the user interface, the key selected by the user while interacting with the user interface, the key associated with the capture of the image; and (2) determining, by the processor of the electronic device, a finger corresponding to the key of the user interface;
   determining, by the processor, whether the plurality of biometric images correspond to a single finger of the user;
   in response to the determining that the plurality of biometric images correspond to the single finger of the user, selecting, for comparison to the plurality of captured images, by the processor of the electronic device, at least one reference image from a plurality of reference images based on the single finger of the user corresponding to the plurality of biometric images;
   comparing, by the processor of the electronic device, the plurality of biometric images with the at least one selected reference image; and
   authenticating the user for access to the electronic device based on the comparing.

2. The method of claim 1, wherein the user interface comprises a virtual keyboard on a touchscreen of the electronic device.

3. The method of claim 1, wherein the user interface comprises a physical keyboard.

4. The method of claim 1, wherein comparing the plurality of biometric images with the at least one selected reference image results in a plurality of comparisons, the method further comprising combining results of the plurality of comparisons into a single result.

5. The method of claim 1, wherein comparing the plurality of biometric images with the at least one selected reference image comprises:
combining the plurality of biometric images into a composite image; and
comparing the composite image with the at least one selected reference image.

6. The method of claim 5, wherein the combining the plurality of biometric images into a composite image further comprising stitching the plurality of biometric images together to form the composite image of a fingerprint.

7. The method of claim 6, wherein at least two of the captured plurality of biometric images are each associated with a different key of the user interface.

8. The method of claim 1, further comprising:
capturing behavioral biometric data; and
comparing the captured behavioral biometric data with stored behavioral biometric data;
wherein the authenticating the user for access to the electronic device is further based on the comparing the captured behavioral biometric data with the stored behavioral biometric data.

9. The method of claim 8, further comprising combining (i) information regarding the comparison of the plurality of biometric images with the at least one selected reference image and (ii) results of the comparison of the captured behavioral biometric data with results of the stored behavioral biometric data to create a combined comparison score.

10. The method of claim 1, wherein capturing the plurality of biometric images occurs after an initial authentication using the electronic device.

11. The method of claim 1, wherein the provided information is used to determine a functionality of the application for the user.

12. The method of claim 1, wherein the selecting the at least one reference image from the plurality of reference images for comparison to the plurality of captured images is based on an orientation of the electronic device when the user is interacting with the user interface.

13. The method of claim 1, wherein the determining the finger corresponding to the key of the user interface includes selecting the finger from a plurality of fingers associated with the key.

14. The method of claim 13, wherein each one of the plurality of fingers is associated with at least one different reference image of the plurality of reference images.

15. The method of claim 1, wherein the determining the finger corresponding to the key of the user interface is based on a mapping between the key of the user interface and the finger.

16. The method of claim 15, wherein each key of the user interface is mapped to at least one finger of the user and at least two keys of the user interfaces are mapped to one finger of the user.

17. A device comprising:
a user interface;
one or more sensors configured to capture a plurality of biometric images in succession over a period of time while a user is interacting with the user interface to input user data used for a non-authentication operation; and
a processing unit communicatively coupled with the one or more sensors, the processing unit configured to:
for each image of the plurality of biometric images: (1) determine a key of the user interface, the key selected by the user while interacting with the user interface, the key associated with the capture of the image; and (2) determine a finger corresponding to the key of the user interface;
determining whether the plurality of biometric images correspond to a single finger of the user;
in response to the determining that the plurality of biometric images correspond to the single finger of the user, select, for comparison to the plurality of captured images, at least one reference image from a plurality of reference images based on the single finger of the user corresponding to the plurality of biometric images; and
compare the plurality of biometric images with the at least one selected reference image; and
authenticate the user for access to the electronic device based on the comparing.

18. The device of claim 17, further comprising a touchscreen, wherein the user interface comprises a virtual keyboard on the touchscreen.

19. The device of claim 17, wherein the processing unit is further configured to:
make a plurality of comparisons by the comparing of each image of the plurality of biometric images with the at least one selected reference image, and
combine results of the plurality of comparisons into a single result.

20. The device of claim 17, wherein the comparing the plurality of biometric images with the at least one selected reference image comprises:
combining the plurality of biometric images into a composite image; and
comparing the composite image with the at least one selected reference image.

21. The device of claim 17, wherein the processing unit is further configured to:
capture behavioral biometric data; and
compare the captured behavioral biometric data with stored behavioral biometric data;
wherein the authenticating the user for access to the electronic device is further based on the comparing the captured behavioral biometric data with the stored behavioral biometric data.

22. The device of claim 21, wherein the processing unit is further configured to combine (i) information regarding the comparison of the plurality of biometric images with the at least one selected reference image and (ii) results of the comparison of the captured behavioral biometric data with results of the stored behavioral biometric data to create a combined comparison score.

23. The device of claim 17, wherein the processing unit is configured to cause the one or more sensors to capture the plurality of biometric images after the device makes an initial authentication.

24. The device of claim 17, wherein the provided information is used to determine a functionality of the application for the user.

25. A non-transitory computer-readable storage medium having instructions embedded therein for authenticating a user of an electronic device, the instructions, when executed by one or more processors of the electronic device, cause the one or more processors to:
capture, by one or more sensors of the electronic device, a plurality of biometric images in succession over a period of time while the user is interacting with a user interface of the electronic device to input user data used for a non-authentication operation;
for each image of the plurality of biometric images: (1) determine a key of the user interface, the key selected by the user while interacting with the user interface, the key associated with the capture of the image; and (2) determining, by the processor of the electronic device, a finger corresponding to the key of the user interface;

determining whether the plurality of biometric images correspond to a single finger of the user;

in response to the determining the finger corresponding to the key, select, for comparison to the captured image, at least one reference image from a plurality of reference images based on the finger corresponding to the key of the user interface, wherein the plurality of reference images are associated with several keys of the user interface; and compare the plurality of biometric images with the at least one selected reference image; and authenticate the user for access to the electronic device based on the comparing.

26. The non-transitory computer-readable storage medium of claim 25, wherein the user interface comprises a virtual keyboard on a touchscreen of the electronic device, the instructions further cause the one or more processors to display the virtual keyboard.

27. The non-transitory computer-readable storage medium of claim 25, wherein the computer code for comparing each image of the plurality of biometric images with the at least one selected reference image results in a plurality of comparisons, the instructions cause the one or more processors to combine results of the plurality of comparisons into a single result.

28. The non-transitory computer-readable storage medium of claim 25, wherein the comparing the plurality of biometric images with the at least one selected reference image includes:

combining the plurality of biometric images into a composite image; and comparing the composite image with the at least one reference image.

29. The non-transitory computer-readable storage medium of claim 25, wherein the instructions further cause the one or more processors to:

capture behavioral biometric data; and compare the captured behavioral biometric data with stored behavioral biometric data;

wherein the authenticating the user for access to the electronic device is further based on the comparing the captured behavioral biometric data with the stored behavioral biometric data.

30. The non-transitory computer-readable storage medium of claim 29, wherein the instructions further cause the one or more processors to combine (i) information regarding the comparison of the plurality of biometric images with the at least one selected reference image and (ii) results of the comparison of the captured behavioral biometric data with results of the stored behavioral biometric data to create a combined comparison score.

31. The non-transitory computer-readable storage medium of claim 25, wherein the instructions further cause the one or more processors to determine whether a threshold level of authentication is met based on the comparing, wherein upon determining that the threshold level of authentication is met, authenticating the user for access to the electronic device.

32. The non-transitory computer-readable storage medium of claim 25, wherein the instructions further cause the one or more processors to capture the plurality of biometric images occurs after an initial authentication using the electronic device.

33. The non-transitory computer-readable storage medium of claim 25, wherein the provided information is used to determine a functionality of the application for the user.

34. An apparatus comprising:

means for capturing a plurality of biometric images in succession over a period of time with one or more sensors while a user is interacting with a user interface of the apparatus to input user data used for a non-authentication operation;

means for, for each image of the plurality of biometric images: (1) determining a key of the user interface, the key selected by the user while interacting with the user interface, the key associated with the capture of the image; and (2) determining a finger corresponding to the key of the user interface;

means for determining whether the plurality of biometric images correspond to a single finger of the user;

means for, in response to the determining that the plurality of biometric images correspond to the single finger of the user, selecting, for comparison to the plurality of captured images, by the processor of the electronic device, at least one reference image from a plurality of reference images based on the single finger of the user corresponding to the plurality of biometric images; and means for comparing the plurality of biometric images with the at least one selected reference image; and means for authenticating the user for access to the electronic device based on the comparing.

35. The apparatus of claim 34, wherein the user interface comprises a virtual keyboard, and the apparatus further comprises means for displaying the virtual keyboard.

36. The apparatus of claim 34, wherein the means for comparing each image of the plurality of biometric images with the at least one selected reference image are configured to cause a plurality of comparisons, and the apparatus further comprises means for combining results of the plurality of comparisons into a single result.

37. The apparatus of claim 34, wherein the means for comparing the plurality of biometric images with the at least one selected reference image comprises means for:

combining the plurality of biometric images into a composite image; and comparing the composite image with the at least one reference image.

38. The apparatus of claim 34, further comprising means for:

capturing behavioral biometric data; and comparing the captured behavioral biometric data with stored behavioral biometric data;

wherein the authenticating the user for access to the electronic device is further based on the comparing the captured behavioral biometric data with the stored behavioral biometric data.

* * * * *